United States Patent

Sweeney et al.

[15] 3,700,733
[45] *Oct. 24, 1972

[54] PREPARATION OF POLYHALOISOALKOXYALKANOIC ACIDS AND DERIVATIVES THEREOF

[72] Inventors: Richard Francis Sweeney, Elma, N.Y.; Charles Cheng-Yu Yao, Long Valley, N.J.

[73] Assignee: Allied Chemical Corporation, New York, N.Y.

[ * ] Notice: The portion of the term of this patent subsequent to Feb. 3, 1987, has been disclaimed.

[22] Filed: Oct. 1, 1969

[21] Appl. No.: 862,953

[52] U.S. Cl.........260/544 F, 260/468 R, 260/484 R
[51] Int. Cl.............................................C07c 51/58
[58] Field of Search........................260/544 Y, 544 F

[56] References Cited

UNITED STATES PATENTS

| | | |
|---|---|---|
| 3,493,611 | 2/1970 | Sweeney.....................260/544 |
| 3,102,139 | 8/1963 | Lawlor.......................260/546 |
| 3,351,644 | 11/1967 | Hauptschein..............260/408 |
| 2,511,072 | 6/1950 | McCann......................23/174 |

OTHER PUBLICATIONS

Lovelace et al., Aliphatic Flourine Compounds, (1958) Rheinhold pp. 221– 222.
Noller, Chemistry of Organic Compounds, 3rd ed. (1965) Saunders p. 161

*Primary Examiner*—Lorraine A. Weinberger
*Assistant Examiner*—Richard D. Kelly
*Attorney*—Jay P. Friedenson

[57] ABSTRACT

Antimony pentahalides selected from the group $SbCl_5$, $SbF_5$ and $SbF_3Cl_2$ catalyze the oxidation of polyhaloisoalkoxy-alkyl iodides with $SO_3$ or oleum. The products of the reaction are the corresponding acid halides and pyrosulfuryl halides which may be converted to the free acids or acid derivatives. The acids, salts and esters thereof are surface active. The acids are further useful as stain repellent agents.

30 Claims, No Drawings

PREPARATION OF POLYHALOISOALKOXYALKANOIC ACIDS AND DERIVATIVES THEREOF

CROSS-REFERENCES TO RELATED APPLICATIONS AND PATENTS

1. U. S. Pat. No. 3,453,333 to Litt et al., entitled "Fluorinated Ethers", issued July 1, 1969.
2. Copending application of Litt et al., entitled "Fluorinated Ethers", Ser. No. 513,574, filed Dec. 13, 1965.
3. Copending application of Anello et al., entitled "Telomers and Process for the Preparation Thereof", Ser. No. 633,359, filed Apr. 25, 1967.
4. Copending application of Anello et al., entitled "Polyfluoroisoalkoxyalkyl Halides", Ser. No. 818,832, filed Apr. 23, 1969.
5. Copending application of Anello et al., entitled "Fluorocarbon Compounds", Ser. No. 721,117, filed Apr. 12, 1968.
6. Copending application of Anello et al., entitled "Fluorocarbon Acids and Derivatives", Ser. No. 721,115, filed Apr. 12, 1968.
7. Copending application of Sweeney et al., entitled "Preparation of Perfluoroacyl Fluorides", Ser. No. 525,143, filed Feb. 4, 1966.

BACKGROUND OF THE INVENTION

Copending applications of Anello et al., Ser. Nos. 721,117 and 721,115, mentioned supra, cover novel polyhaloisoalkoxyalkanoic acids and derivatives thereof, useful as surface active agents, strain repellent agents and as intermediates for the preparation of other surface active and stain repellent agents.

Certain polyhaloalkanoic acid fluorides have been prepared by oxidation of polyhaloalkyl iodides with $SO_3$ or oleum (U. S. Pat. No. 3,102,139 and 3,351,744). The resulting acid fluorides may then be converted to the free acids and various acid derivatives by conventional methods. Oxidation of perfluoroalkyl iodides to the corresponding acid fluorides, particularly in the absence of a catalyst, is notoriously difficult with very low conversions, if any, being obtained. When it was attempted to apply these procedures to prepare the subject class of ether acids, it was found that the conversions of the corresponding ether iodide starting materials to the acid products were exceedingly small.

Accordingly, the object of the present invention is to provide a catalyst for the reaction between polyhaloisoalkoxyalkyl iodides and $SO_3$ or oleum to enable higher conversions of the iodides to the acidic products to be obtained.

SUMMARY OF THE INVENTION

It has been found that the reaction between the herein defined class of polyhaloisoalkoxyalkyl iodides and $SO_3$ or oleum to produce the corresponding acid fluorides, is catalyzed by an antimony pentahalide selected from the group consisting of $SbCl_5$, $SbF_5$ and $SbF_3Cl_2$, and mixtures thereof. As compared with non-catalyzed runs of these reactions, the rate of reaction is substantially increased and significantly higher conversions of the iodide starting material to the acid products are obtainable. The obtainment of a substantially higher reaction rate is of further advantage since it permits the reaction to be carried out effectively at atmospheric pressure and at relatively low temperatures. The novel catalytic process is of particular value for the synthesis of the difficult to prepare perfluorinated acid species in accordance with the invention.

The class of polyhaloisoalkoxyalkyl iodide starting materials which may be used in accordance with the invention process is defined by the following formula.

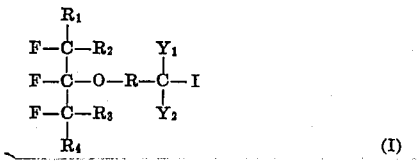

wherein $R_1$—$R_4$ are independently selected from the group consisting of F, Cl, alkyl and haloalkyl groups in which the halogen atoms are Cl or F, $R_1$ and $R_4$ when taken together and with the carbon chain therebetween, form a cyclic structure, R is alkylene or haloalkylene in which the halogen atoms are selected from Cl and F, $Y_1$ is selected from Cl and F, and $Y_2$ is selected from H, F, Cl and perhaloalkyl groups in which the halogen atoms are selected from F and Cl.

The major direct acidic products of the subject reaction are the corresponding acid fluorides of the formula:

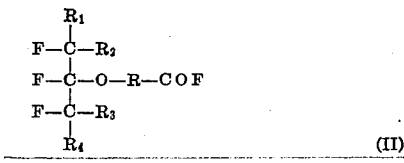

wherein $R_1$—$R_4$ and R are as defined above. Minor amounts of pyrosulfuryl halides are formed as by-products.

DETAILED DESCRIPTION OF THE INVENTION AND OF THE PREFERRED EMBODIMENTS

With reference to formula (I) for the iodide starting materials useful in accordance with the invention process, $R_1$—$R_4$, if alkyl or haloalkyl groups, may be straight chain or branched chain. There is no particular criticality as to the number of carbon atoms in such groups. A preferred carbon content for such groups is from one to nine carbon atoms and still preferred is from one to two carbon atoms. $R_1$—$R_4$ are preferably F, Cl or perhaloalkyl groups. Still preferably, any perhaloalkyl groups are perfluoroalkyl groups. When the $R_1$—$R_4$ groups contain chlorine substitution or hydrogen substitution, it is preferred that enough fluorine substitution be provided so that the atomic ratio of fluorine to chlorine atoms to the hydrogen atoms or to the combined total of the chlorine and hydrogen atoms, is at least 1:1. In the most preferred embodiment $R_1$—$R_4$ are all F.

There is no particular criticality for the carbon content of the R group in formula (I). Preferably, the R group contains one to 80 carbon atoms, still preferably from one to 40 carbon atoms, and most preferably from one to 15 carbon atoms. When R contains chlorine substitution or hydrogen substitution, it is preferred that enough fluorine substitution be provided so that the atomic ratio of fluorine to chlorine atoms to hydrogen atoms, or to the combined total of the chlorine and hydrogen atoms, is at least 1:1. A preferred structure for the R group is —(CF$_2$)m(CH$_2$)n— wherein $m$ is an integer of from one to 40, preferably one to 15, and $n$ is 0 or an integer of from one to 40, preferably one to 15. The R group is still preferably a perhaloalkylene group and most preferably is a perfluoroalkylene group containing one to 15 carbon atoms. The R group is saturated and may be straight chain or branched chain, cyclic chain or a combination thereof.

When $Y_1$ is a perhaloalkyl group, $Y_1$ preferably contains one to six carbon atoms, and still preferably from one to three carbon atoms.

The polyhaloisoalkoxyalkyl iodide starting materials are the telogen and telomer products which are disclosed in U. S. Pat. 3,453,333 and copending applications Ser. Nos. 513,574, 633,359 and 818,832, mentioned supra. Polyhaloorganoalkyl iodide starting materials of formula (I) in which R contains a single carbon atom, are telogens which may be prepared by reacting an appropriate perhalogenated cyclic or acyclic ketone with an ionizable fluoride salt, e.g., KF, to form a fluorinated organic salt and then reacting the organic salt with a halogen other than fluorine (e.g. iodine or bromine) and an appropriate olefin, such as tetrafluoroethylene, in the presence of an inert organic solvent, to form the desired telogen. The reaction between the perhalogenated ketone with the ionizable fluoride salt proceeds readily at room temperature and is best carried out under anhydrous conditions in the presence of an inert organic solvent such as acetonitrile or dimethyl formamide. The reaction between the fluorinated organic salt with the olefin and a halogen also proceeds readily at room temperature and may be conducted in the same solvent medium as the first mentioned reaction. These reactions are more fully described in U. S. Pat. 3,453,333 and copending application Ser. No. 513,574, mentioned supra.

The longer chain polyhaloorganoalkyl iodide starting materials, possessing an even number of carbon atoms linking the oxygen and iodine atoms, are telomers which may be prepared by telomerizing the telogens described above with a telomerizable unsaturated material comprising an olefin possessing only halogen and hydrogen substituents.

The telogens may first be telomerized to a desired molecular weight with a first olefin and then the resulting telomer product may optionally be further telomerized to a higher molecular weight with an additional olefin or olefins. Preferably, the olefin or olefins reacted with the telogens are so chosen and the degree of telomerization is so adjusted that the R moiety possesses a ratio of halo atoms to hydrogen atoms of at least 1:1.

The telomerization reaction is carried out under free radical conditions. The free radicals are preferably produced with thermal initiation of the reaction and this is accomplished simply be heating the reactants to an elevated temperature. The elevated temperature should normally be between about 100° c. and 350° C., preferably between about 150° C. -200° C. Alternatively, conventional free radial generating catalysts may be employed to initiate the reaction. Although the reaction may be conducted at atmospheric pressure, superatmospheric pressures, for example, up to about 20,000 p.s.i.g. may be used with pressures between about 100 p.s.i.g and about 10,000 p.s.i.g. being especially preferred. The chain length of the resulting product is influenced by the reaction period which may vary from about 10 minutes to about two weeks.

The ratio of telogen to olefin may vary from about 1:75 to as high as 200:1, the preferred ratio for batchwise operation being about 1:1 to 2:1 in the production of relatively low molecular weight telomers, i.e., telomers containing up to about 6 or 7 monomer units per telomer molecule. On the other hand, in a constant pressure reaction, i.e., where a constant pressure of olefin is maintained above the liquid phase comprising the telogen during the reaction, the molecular weight of telomer product may be controlled by varying the pressure of the olefin. In general, the higher the pressure of the olefin, the higher the molecular weight of the telomer product.

The telomerization reaction inherently produces a mixture of telomers of varying chain lengths and corresponding varying molecular weights. The average chain length and the spread of molecular weight produced by the telomerization reaction may be controlled within limits as discussed above by varying the reactant proportions, reaction time, reaction temperature, reaction pressure and other reaction variables. If desired, individual telomer products can be separated from mixtures thereof by conventional separatory techniques, for example, by fractional distillation, fractional crystallization using an inert solvent such as diethyl ether, or the mixture of telomer products may be separated into fractions of narrower ranges of molecular weights having a desired viscosity or other properties.

The telomerization reaction is described in more detail in copending application Ser. No. 633,359, mentioned supra, and in corresponding Belgian Pat. No. 714,162.

Illustrative olefins suitable for telomerization include the following: CF$_2$=CF$_2$, CF$_2$=CH$_2$, CF$_2$=CClF, CF$_3$=CF$_2$, CH$_2$=CH$_2$, CCl$_2$=CH$_2$, CFH/CH$_2$, CClH=CH$_2$, CFH=CF$_2$, CFH=CFH, CClH=CClH, CF$_2$ClCF=CH$_2$, CF$_3$CH=CF$_2$, CF$_3$CCl=CF$_2$, (CF$_3$)$_2$C=CF$_2$, CF$_3$CF=CFCl, CF$_3$CH=CFCl, CFCl=CFCl, CF$_3$CF=CH$_2$, CF$_2$ClCF=CF$_2$, CF$_3$CF=CFCF$_3$, CHF=CFCFCl$_2$, CHF=CFCF$_3$, CF$_2$=CF(CH$_2$)$_6$CH$_3$, CF$_2$=CFCHClCH$_3$, CF$_2$=CHCH$_2$CH$_3$, CF$_2$=CHCH$_2$CH$_2$Cl, CF$_2$=C(CF$_3$)CF$_2$(C$_3$H$_7$), CHCl=CFCF$_3$, CH$_2$=CClCF$_2$CH$_3$,

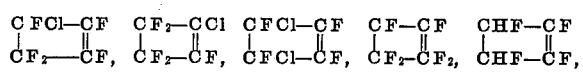

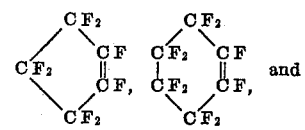
and

CH$_2$=C(C$_2$H$_5$)$_2$. Many more suitable olefins will readily occur to one of ordinary skill in the art.

The longer chain polyhaloorgano alkyl iodide starting materials, possessing an odd number of carbon atoms linking the oxygen and iodine atoms, are telomers which may be prepared by the following procedure. A polyhaloorgano alkyl iodide telogen as defined by formula I above, wherein the R group contains one carbon atom, is reacted with sulfur trioxide to form an acid halide. This reaction is carried out at temperatures between about 50°–175° C. Preferably, an excess of $SO_3$ is used and sufficient pressure is employed to maintain the reactants in liquid phase. The acid halide is hydrolyzed to the acid by refluxing in water. The resulting acid has a single carbon atom linking the oxygen atom with the carboxy group. This acid can then be converted to the corresponding telogen iodide possessing a single carbon atom linking the oxygen and iodine atoms by the well known Hunsdiecker reaction which involves reacting the acid with alkali-free silver oxide ($Ag_2O$) to form the silver salt, followed by reaction of the silver salt with powdered iodine to form the iodide. This telogen iodide can then be telomerized with one or more olefins to produce telomer iodides having an odd number of carbon atoms linking the oxygen and iodine atoms. Illustrative procedures are shown as follows:

$$(CF_3)_2CFOCF_2CF_2I \xrightarrow[H_2O]{SO_3} (CF_3)_2CFOCF_2COF$$
$$(CF_3)_2CFOCF_2COF \xrightarrow{} (CF_3)_2CFOCF_2COOH$$
$$(CF_3)_2CFOCF_2COOH \xrightarrow{Ag_2O} (CF_3)_2CFOCF_2COOAg$$
$$(CF_3)_2CFOCF_2COOAg \xrightarrow{I_2} (CF_3)_2CFOCF_2I$$
$$(CF_3)_2CFOCF_2I \xrightarrow{CF_2=CF_2} (CF_3)_2CFOCF_2(CF_2CF_2)_mI$$

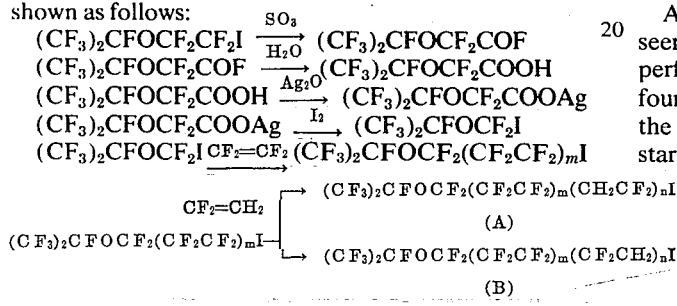

It should be noted that the above-noted telomerization reaction produces two products (A) and (B). The (A) product is obtained in about a 95 percent yield. The (B) product is obtained in about a 5 percent yield. The (A) and (B) products can be separated by conventional procedures. For example, deydroiodinating the (A) and (B) product mixture with KOH at 75°–150° C. preferentially converts product (A) to the corresponding olefin which can then readily be separated from product (B) by distillation.

Other methods can readily be devised by those skilled in the art for preparing polyhaloorganoalkyl iodide starting materials suitable for use in the invention process.

$SO_3$, if used as the oxidizing agent, may be added in any physical state but is presently added in liquid form. Unstabilized liquid sulfur trioxide may be used but technical grade, stabilized forms of liquid sulfur trioxide are convenient and are well suited for use.

The oleum reactant consists of $H_2SO_4$ and $SO_3$. For example, so-called "20 percent oleum" consists of 80 percent by weight $H_2SO_4$ and 20 percent by weight free $SO_3$. The $H_2SO_4$ component of the oleum will be understood as being 100 percent $H_2SO_4$ concentration. The term "oleum" as used herein is intended to refer to any mixtures of $SO_3$ and 100 percent $H_2SO_4$. There is not upper limitation on the $SO_3$ strength of the oleum which may be used according to the invention process since pure $SO_3$ may be used. If the acid halide product is desired in favor of the free acid, the $SO_3$ concentration in the oleum mixture should be at least about 20 percent and preferably in the range of about 20 to 70 percent and, still preferably, from about 25 to 50 percent. If the free acid is sought, such can be favored in the product mixture by maintaining the $SO_3$ concentration of the oleum employed below about 20 percent.

The reaction between the iodide starting material and oxidizing agent will proceed even when only trace amounts of the antimony pentahalide catalyst are employed, for example, as low as about 0.02 mol of catalyst per mol of iodide starting material reactant. In the interest of obtaining greater conversions of starting material within shorter reaction periods, larger quantities of the catalyst should be used. A satisfactory operating range of catalyst concentration to iodide starting material is between about 0.3 to 2.0 mols of catalyst per mol of iodide starting material. A preferred molar ratio of the antimony pentahalide catalyst to the iodide starting material is from about 2:1 to 1:1 and still preferably from about 2:1 to 1.5:1. Use of catalyst concentration above 2.0:1 does not deleteriously affect the reaction but does not contribute significantly move to the reaction rate and is uneconomical. The catalyst may be added all at once, in small portions or continuously over the reaction period. For reasons of convenience it is preferred to add the entire amount of catalyst at the beginning of the reaction.

Although the stoichiometry of the reaction would seem to require one mol of oxidizing agent per mol of perfluoroalkyl iodide starting material, it has been found that, for best results, a stoichiometric excess of the oxidizing agent relative to the amount of iodide starting material, should be employed. The ratio of $SO_3$, either alone or dissolved in sulfuric acid to form the oleum reactant, to the iodide starting material, is accordingly preferably maintained in the range of about 1.1–20:1. Use of higher concentrations of $SO_3$ does not deleteriously affect the reaction but would not be economical. The preferred ratio of $SO_3$ to the starting material is in the range of about 3–15:1.

The reaction temperature is not critical and may vary over a wide range such as from about zero up to the reflux temperature of the reaction mixture. For best results the reaction should be run at the reflux temperature of the reaction mixture. This will depend largely on the proportions of the reactant present and upon the boiling point of the product. In the case of $SO_3$ the reflux temperature will usually be at least about 40° C. whereas with oleum the reflux temperature will usually be at least about 170° C.

One of the major advantages of the invention process is that it can be efficiently run at atmospheric pressures, thus obviating the expense and inconvenience of operating high pressure equipment. If desired, however, superatmospheric or subatmospheric pressures may be employed. Elevated pressures would tend to diminish reaction times.

Reaction time for complete conversion is normally between about 18–48 hours. Substantial amounts of product will, however, ordinarily be formed after about one half hour of reaction. End point of reaction may be determined by observing when the reflux temperature of the product mixture remains constant over a significant period of time.

The process is carried out by heating a mixture of the selected iodide starting material, a selected antimony pentahalide catalyst, and either sulfur trioxide or oleum, preferably to the reflux temperature of the mixture. Lower boiling products of the reaction which tend to distill from the mixture may be condensed in a cold trap. At the end of the reaction period the mixture is cooled to ambient temperature. The organic materials in the product mixture have limited solubility in the inorganic portion of the product mixture and form a separate phase, and thus may be easily separated. If sulfur trioxide has been employed as the reactant and used in a large excess, the organic materials in the product mixture may not form a separate phase. In such an event, the desired product may be easily recovered by fractional distillation or by extraction with organic solvents. Further purification of the product, if desired, may be accomplished by conventional techniques such as fractional distillation or recrystallization.

The acidic products produced in accordance with the procedures described above comprise a major amount of the acid halides. These, of course, may be converted to the free acids, if desired, by hydrolysis. The acid products may then be recovered by extraction with a solvent, such as methylene chloride. The acids can be converted into their esters by conventional esterification techniques, such as by reaction with an alkanol.

If desired, the acidic products obtained by the oxidation reaction may be converted in situ to acid derivatives such as the esters without first isolating the acid halide products. For example, the crude products from the oxidation reaction, containing both organic and inorganic phases, may be heated with an alkanol to form the alkyl esters. Preferably, a substantial excess of alkanol should be employed in order to insure completeness of the esterification reaction. After the esterification reaction, the organic phase may be separated, water washed, dried and then purified by conventional methods such as fractional distillation or recrystallization.

As discussed in copending applications Ser. Nos. 721,117 and 721,115, mentioned supra, the acid halides may be hydrolyzed to the corresponding acid salts with an aqueous base such as potassium hydroxide or sodium hydroxide. The acid salts exhibit unusually high surface active properties and may be used in the manner in which surfactants are conventionally employed such as in the preparation of emulsifiers and surface coatings and to increase wettability such as in the dyeing of textile fabrics. From these salts free acids may be generated with aqueous mineral acids such as HCl or $H_2SO_4$. The acid halides may also be reacted with an alkanol, as described in more detail in the examples, to form the corresponding esters. The esters are surface active. The esters are particularly useful intermediates for reaction with amines to give amide derivatives. The amide derivatives are useful as oil, stain and water repellent agents. The free acids, in addition to being surface active, are useful as oil and stain repellent agents.

The following examples provide a further description of the invention, it being understood that these examples are given for purpose of illustration only and are not to be regarded as restricting the invention which is defined by a reasonable interpretation of the appended claims. Parts are by weight except as otherwise indicated.

EXAMPLE I 32.8 G. (0.41 mol) of liquid sulfur trioxide were added drop-wise, with stirring, to 25 g. (0.041 mol) of $(CF_3)_2CFO(CF_2)_6I$ contained in a 100 ml. 3-neck flask, equipped with a thermal well, dropping funnel, stirrer and a reflux condenser, which condenser was connected to a dry ice acetone cooled trap. The mixture was refluxed for a period of 21 hours and then cooled to 25° C. The flask contents were worked up as follows in order to convert any acid fluoride product to the corresponding methyl ester. The contents of the flask were transferred to a dropping funnel and carefully added to 64 g. (2.0 mol) of methanol containing 1 ml. of concentrated $H_2SO_4$. The resulting mixture was heated under reflux conditions for 18 hours. At the end of this period the mixture was cooled to ambient temperature and allowed to separate into two layers. The lower heavier organic layer weighing 20.7 g. was isolated. Infrared analysis showed that the lower layer consisted of the iodide starting material. No absorption band consistent with an ester was present. The fact that no ester was formed established that no acidic products were formed by the described treatment of $(CF_3)_2CFO(CF_2)_6I$ with $SO_3$.

EXAMPLE II

The procedure of Example I was repeated with the exception that 2.39 g. (0.004 mol) of antimony pentachloride, $SbCl_5$, was added to the mixture of $(CF_3)_2CFO(CF_2)_6I$ and sulfur trioxide before the first reflux period. After the work-up with the methanol, 20.7 g. of a lower heavier organic layer were obtained. Infrared analysis indicated that about 41 percent of this layer consisted of the methyl ester, $(CF_3)_2CFO(CF_2)_5CO_2$—$CH_3$ (corresponding to a 42 percent conversion). Gas liquid chromatagraphic analysis showed the presence of about 1 percent of $(CF_3)_2CFO(CF_2)_6Cl$ with the balance being the iodide starting material.

EXAMPLE III

A mixture of 36.4 g. (0.04 mol) of $(CF_3)_2CFO(CF_2CF_2)_6I$ and 88 g. of 20 percent oleum was charged to apparatus as used in the above examples and refluxed (at about 143° C.) for a period of 18 hours. At the end of this period the reaction mixture was cooled to ambient temperature and the product mixture was filtered through a sintered glass filter. The residue collected on the filter was rinsed with concentrated $H_2SO_4$ and dried on the filter. 36 G. of a solid product were obtained. The 36 g. of solid product were worked-up as follows in order to convert any acidic product to the methyl ester. The solid product was mixed with 50 ml. methanol and 1 ml. of concentrated $H_2SO_4$ and heated under reflux conditions, with stirring, for a period of two hours. At the end of this period the mixture was permitted to cool to 25° C. following which it was filtered to provide 32 g. of a white solid. Infrared analysis of the while solid material recovered showed it to consist mostly of the iodide starting material with a small amount (about 5 percent conversion) of the ester $(CF_3)_2CFO(CF_2)_{11}CO_2CH_3$.

EXAMPLE IV

The procedure of Example III was repeated except that 32 g. (0.035 mol) of the starting iodide material $(CF_3)_2CFO(CF_2CF_2)_6I$ and 88 g. of 20 percent oleum were heated under reflux conditions for a period of 96 hours before the work-up with methanol. Infrared analysis of the solid product of this experiment showed that approximately 16 percent of the iodide starting material was converted to the ester $(CF_3)_2CFO(CF_2)_{11}CO_2CH_3$. This experiment shows that increasing the reaction period from 18 hours to 96 hours only results in a 16 percent conversion.

EXAMPLE V

The procedure of Example III was repeated except that 5 g. )0.0055 mol) of $(CF_3)_2CFO(CF_2CF_2)_6I$, 12.2 g. of 20 percent oleum and 0.25 g. (0.00083 mol) of antimony pentachloride, $SbCl_5$, were charged to the flask and were heated under reflux, with stirring, for 48 hours. Infrared analysis of the product after the work-up with methanol showed that about 30 percent of the iodide starting material had been converted to the methyl ester. This experiment shows that the presence of antimony pentachloride had a significant effect upon the conversion of iodide starting material to ester product. Approximately twice the conversion was obtained after only about half the reaction period used for the experiment of Example IV with no catalyst.

EXAMPLES 6 to 34

The procedure of Examples I and III are repeated with $SO_3$ and oleum oxidizing agents and with the same molar proportions of reactants and catalyst except that the iodide starting materials, the catalysts, and the ester products vary as indicated in the following table.

TABLE

| Example | Starting material | Oxidizing agent | Catalyst | End product |
|---|---|---|---|---|
| (6) | $(CF_3)_2CFO-CF_2CF_2CH_2CH_2CF_2CCl_2I$ | $SO_3$ | $SbCl_5$ | $(CF_3)_2CFO-CF_2CF_2CH_2CH_2CF_2CO_2CH_3$ |
| (7) | $(CF_3)_2CFO-(CF_2)_5(CH_2)_3CCl_2CClFI$ | 70% oleum | $SbCl_3F_2$ | $(CF_3)_2CFO-(CF_2)_5(CH_2)_3CCl_2CO_2CH_3$ |
| (8) | $(CF_3)_2CFO-(CH_2)_5(CF_2)_7CClHI$ | 25% oleum | $SbCl_5+SbF_5$ | $(CF_3)_2CFO-(CH_2)_5(CF_2)_7CO_2CH_3$ |
| (9) | $(CF_3)_2CFO-(CF_2)_{10}CH_2CF_2CFHI$ | 50% oleum | $SbF_5$ | $(CF_3)_2CFO-(CF_2)_{10}CH_2CF_2CO_2CH_3$ |
| (10) | $(CF_3)_2CFO-(CH_2)_8CF_2CF_2I$ | 40% oleum | $SbCl_5$ | $(CF_3)_2CFO-(CH_2)_8CF_2CO_2CH_3$ |
| (11) | $(CF_3)_2CFO-(CF_2)_8CHClCCl_2I$ | $SO_3$ | $SbF_5$ | $(CF_3)_2CFO-(CF_2)_8CHClCO_2CH_3$ |
| (12) | $(CF_3)_2CFO-(CF_2)_3CF_2CFHCClFI$ | 70% oleum | $SbCl_5$ | $(CF_3)_2CFO-(CF_2)_3CF_2CFHCO_2CH_3$ |
| (13) | $\begin{array}{c}CF_3\\ \diagdown\\ CFO-CFHCH_2(CClFCF_2)_6CF_2I\\ \diagup\\ CF_2\\ \vert\\ n\text{-}C_9H_{19}\end{array}$ | $SO_3$ | $SbCl_3F_2$ | $\begin{array}{c}CF_3\\ \diagdown\\ CFO-CFHCH_2(CClFCF_2)_6CO_2CH_3\\ \diagup\\ CF_2\\ \vert\\ n\text{-}C_9H_{19}\end{array}$ |
| (14) | $\begin{array}{c}F(CF_2)_3\\ \vert\\ F-C-O-(CF_2)_4(CH_2)_2CF_2CClHI\\ \vert\\ F(CF_2)_3\end{array}$ | 25% oleum | $SbCl_5+SbF_5$ | $\begin{array}{c}F(CF_2)_3\\ \vert\\ F-C-O-(CF_2)_4(CH_2)_2CF_2CO_2CH_3\\ \vert\\ F(CF_2)_3\end{array}$ |
| (15) | $\begin{array}{c}F(CFCl)_4\\ \vert\\ CF_2\\ \vert\\ F-C-O-(CF_2)_6(CH_2)_2CCl_2CCl_2I\\ \vert\\ CF_2\\ \vert\\ F(CFCl)_4\end{array}$ | $SO_3$ | $SbF_5$ | $\begin{array}{c}F(CFCl)_4\\ \vert\\ CF_2\\ \vert\\ F-C-O-(CF_2)_6(CH_2)_2CCl_2CO_2CH_3\\ \vert\\ CF_2\\ \vert\\ F(CFCl)_4\end{array}$ |
| (16) | $\begin{array}{c}CF_3\\ \vert\\ (CF_3)_2CFO-(CF_2)_4CF-CClFI\end{array}$ | 50% oleum | $SbCl_5$ | $\begin{array}{c}CF_3\\ \vert\\ (CF_3)_2CFO-(CF_2)_4CF-CO_2CH_3\end{array}$ |
| (17) | $\begin{array}{c}CF_2Cl\\ \vert\\ (CF_3)_2CFO-CF_2CF_2CF-CClHI\end{array}$ | $SO_3$ | $SbCl_3F_2$ | $\begin{array}{c}CF_2Cl\\ \vert\\ (CF_3)_2CFO-CF_2CF_2CF-CO_2CH_3\end{array}$ |
| (18) | $(CF_3)_2CFOCF_2CF_2CFHI$ | 40% oleum | $SbCl_5+SbCl_3F_2$ | $(CF_3)_2CFOCF_2CF_2CF_2CO_2CH_3$ |
| (19) | $(CF_2Cl)_2CFO(CF_2CF_2)_5CF_2I$ | $SO_3$ | $SbF_5$ | $(CF_2Cl)_2CFO(CF_2CF_2)_5CO_2CH_3$ |
| (20) | $\begin{array}{c}CF_3\\ \vert\\ F-C-F\\ \vert\\ F-C-F\\ \vert\\ F-C-O-CH_2CH_2CF_2CFClCF_2I\\ \vert\\ F-C-F\\ \vert\\ CH_2\\ \vert\\ CF_3\end{array}$ | 70% oleum | $SbCl_5$ | $\begin{array}{c}CF_3\\ \vert\\ F-C-F\\ \vert\\ F-C-O-CH_2CH_2CF_2CFClCO_2CH_3\\ \vert\\ F-C-F\\ \vert\\ CH_2\\ \vert\\ CF_2\end{array}$ |
| (21) | $\begin{array}{c}F(CF_2)_{10}\\ \vert\\ F-C-O-(CF_2CF_2)_{40}(CF_2CFCl)_{40}CCl_2I\\ \vert\\ F(CF_2)_3\end{array}$ | $SO_3$ | $SbCl_3F_2$ | $\begin{array}{c}F(CF_2)_{10}\\ \vert\\ F-C-O-(CF_2CF_2)_{40}(CF_2CFCl)_{40}CO_2CH_3\\ \vert\\ F(CF_2)_3\end{array}$ |
| (22) | $\begin{array}{c}CF_2\\ \diagup\ \diagdown\\ CF_2\quad FC-O-(CF_2CH_2)_{20}(CF_2)_{40}CClFI\\ \diagdown\ \diagup\\ CF_2\end{array}$ | 25% oleum | $SbCl_5+SbF_5$ | $\begin{array}{c}CF_2\\ \diagup\ \diagdown\\ CF_2\quad FC-O-(CF_2CH_2)_{20}(CF_2)_{40}CO_2CH_3\\ \diagdown\ \diagup\\ CF_2\end{array}$ |
| (23) | $\begin{array}{c}CF_2\\ \diagup\ \diagdown\\ CF_2\quad CF_2\\ \vert\quad\quad \vert\\ CF_2\quad FC-O-(CH_2)_7(CF_2)_8CFClHI\\ \diagdown\ \diagup\\ CF_2\end{array}$ | $SO_3$ | $SbF_5$ | $\begin{array}{c}CF_2\\ \diagup\ \diagdown\\ CF_2\quad CF_2\\ \vert\quad\quad \vert\\ CF_2\quad FC-O-(CH_2)_7(CF_2)_8CO_2CH_3\\ \diagdown\ \diagup\\ CF_2\end{array}$ |
| (24) | $\begin{array}{c}F\\ \vert\\ F-C-Cl\\ \vert\\ F-C-O-(CF_2CF_2)_{10}CFHI\\ \vert\\ F-C-F\\ \vert\\ F-C-F\\ \vert\\ Cl\end{array}$ | 50% oleum | $SbCl_5$ | $\begin{array}{c}F\\ \vert\\ F-C-Cl\\ \vert\\ F-C-O-(CF_2CF_2)_{10}CO_2CH_3\\ \vert\\ F-C-F\\ \vert\\ F-C-F\\ \vert\\ Cl\end{array}$ |

TABLE — Continued

| Example | Starting material | Oxidizing agent | Catalyst | End product |
|---|---|---|---|---|
| (25) | $(CF_3)_2CFOCHClCHCl(CF_2CF_2)_6CF_2I$ | $SO_3$ | $SbCl_3F_2$ | $(CF_3)_2CFOCHClCHCl(CF_2CF_2)_6CO_2CH_3$ |
| (26) | $(CF_3)_2CFOCH(CH_3)CH(CH_3)(CF_2CF_2)_6CF_2I$ | 40% oleum | $SbCl+ SbF_5$ | $(CF_3)_2CFOCH(CH_3)CH(CH_3)(CF_2CF_2)_6CO_2CH_3$ |
| (27) | $(CF_3)_2CFOCFHCHCl(CF_2CF_2)_4CCl_2I$ | $SO_3$ | $SbF_5$ | $(CF_3)_2CFOCFHCHCl(CF_2CF_2)_4CO_2CH_3$ |
| (28) | 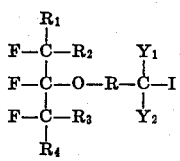 $(CF_3)_2CFO-CF-CF-(CF_2CF_3)_3CClFI$ | 70% oleum | $SbCl_5$ | 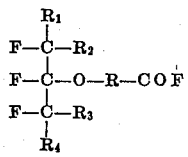 $(CF_3)_2CFO-CF-CF-(CF_2CF_3)_3CO_2CH_3$ |
| (29) | $(CF_3)_2CFO-(CF_2CH_2)_{20}CF_2CClHI$ | $SO_3$ | $SbCl_3F_2$ | $(CF_3)_2CFO-(CF_2CH_2)_{20}CF_2CO_2CH_3$ |
| (30) | $(CF_3)_2CFO-(CH_2CF_2)_5CFHI$ | 25% oleum | $SbCl_5+SbF_5$ | $(CF_3)_2CFO-(CH_2CF_2)_5CO_2CH_3$ |
| (31) | $\begin{array}{c} CCl_3 \\ | \\ (CCl_2)_8 \\ | \\ CF_2 \\ | \\ F-C-O-(CF_2)_8(CH_2)_8CFClCF_2I \\ | \\ CF_3 \end{array}$ | $SO_3$ | $SbF_5$ | $\begin{array}{c} CCl_3 \\ | \\ (CCl_2)_8 \\ | \\ CF_2 \\ | \\ F-C-O-(CF_2)_8(CH_2)_8CFClCO_2CH_3 \\ | \\ CF_3 \end{array}$ |
| (32) | $(CF_3)_2CFO-(CF_2CF_2)_6CH_2CF_2CF_2I$ | 50% oleum | $SbCl_5$ | $(CF_3)_2CFO-(CF_2CF_2)_6CH_2CF_2CO_2CH_3$ |
| (33) | $(CF_3)_2CFO-(CF_2CFCl)_5CH_2CH_2CCl_2CCl_2I$ | $SO_3$ | $SbCl_3F_2$ | $(CF_3)_2CFO-(CF_2CFCl)_5CH_2CH_2CCl_2CO_2CH_3$ |
| (34) | $(CF_3)_2CFO-(CF_2CF[CF_3])_4CH_2CF_2CClFI$ | 40% oleum | $SbCl_5+SbF_5$ | $(CF_3)_2CFO-(CF_2CF[CF_3])_4CH_2CF_2CO_2CH_3$ |

We claim:
1. The process which comprises reacting
a. compounds having the formula

$$\begin{array}{c} R_1 \\ | \\ F-C-R_2 \quad Y_1 \\ | \quad\quad\quad | \\ F-C-O-R-C-I \\ | \quad\quad\quad | \\ F-C-R_3 \quad Y_2 \\ | \\ R_4 \end{array}$$

wherein $R_1$—$R_4$ are independently selected from the group consisting of F, Cl, alkyl and haloalkyl groups in which the halogen atoms are Cl or F, $R_1$ and $R_4$, when taken together and with the carbon chain therebetween, form a cyclic structure, R is alkylene or haloalkylene in which the halogen atoms are selected from Cl and F, $Y_1$ is selected from Cl and F, and $Y_2$ is selected from H, F, Cl and perhaloalkyl groups in which the halogen atoms are selected from F and Cl, with
b. a stoichiometric excess of an oxidizing agent selected from $SO_3$ and oleum, in the presence of an antimony pentahalide selected from $SbCl_5$, $SbF_5$ and $SbCl_3F_2$, or mixtures thereof to obtain as the major reaction products the corresponding acid fluorides of the formula $$\begin{array}{c} R_1 \\ | \\ F-C-R_2 \\ | \\ F-C-O-R-COF \\ | \\ F-C-R_3 \\ | \\ R_4 \end{array}$$

wherein $R_1$, $R_2$, $R_3$, $R_4$ and R have the aforestated meanings.

2. The process according to claim 1 which is carried out at substantially atmospheric pressure.

3. The process according to claim 1 wherein $R_1$—$R_4$ are selected from F, Cl and perhaloalkyl groups.

4. The process according to claim 3 wherein R is a haloalkylene group in which the halogen atoms are Cl or F and in which the atomic ratio of fluorine atoms to chlorine atoms or to hydrogen atoms or to the combined total of the chlorine and hydrogen atoms in the R group is at least 1:1.

5. The process according to claim 4 wherein $R_1$—$R_4$ are each F.

6. The process according to claim 5 wherein the R group contains from one to 40 carbon atoms.

7. The process according to claim 6 wherein the R group contains from one to 15 carbon atoms.

8. The process according to claim 7 wherein $Y_1$ and $Y_2$ are independently selected from the group consisting of F and Cl atoms.

9. The process according to claim 8 wherein $Y_1$ and $Y_2$ are each F atoms.

10. The process according to claim 9 wherein R is a perhaloalkylene group.

11. The process according to claim 9 wherein R has the following structure —$(CF_2)_m(CH_2)_n$— wherein m is an integer of from one to 40 and n is 0 or an integer of from one to 40.

12. The process according to claim 11 wherein m is from one to 15 and n is from zero to 15.

13. The process according to claim 12 wherein the oxidizing agent is $SO_3$.

14. The process according to claim 12 which is carried out at substantially atmospheric pressure.

15. The process according to claim 12 wherein the oxidizing agent is oleum.

16. The process according to claim 15 which is carried out at substantially atmospheric pressure.

17. The process according to claim 11 wherein n is 0.

18. The process according to claim 12 wherein n is 0.

19. The process according to claim 18 wherein the oxidizing agent is $SO_3$.

20. The process according to claim 19 which is carried out at substantially atmospheric pressure.

21. The process according to claim 20 which is carried out in the presence of $SbF_5$.

22. The process according to claim 20 which is carried out in the presence of $SbCl_5$.

23. The process according to claim 20 in which the starting material is $(CF_3)_2CFO(CF_2CF_2)_3I$.

24. The process according to claim 20 in which the starting material is $(CF_3)_2CFO(CF_2CF_2)_6I$.

25. The process according to claim 18 wherein the oxidizing agent is oleum.

26. The process according to claim 25 which is carried out at substantially atmospheric pressure.

27. The process according to claim 26 which is carried out in the presence of $SbF_5$.

28. The process according to claim 26 which is carried out in the presence of $SbCl_5$.

29. The process according to claim 26 in which the starting material is $(CF_3)_2CFO(CF_2CF_2)_3I$.

30. The process according to claim 26 in which the starting material is $(CF_3)_2CFO(CF_2CF_2)_6I$.

* * * * *